(12) United States Patent
Derrien

(10) Patent No.: US 10,611,075 B2
(45) Date of Patent: Apr. 7, 2020

(54) CONTAINER WITH A REINFORCED BASE AND METHOD FOR MANUFACTURING SUCH A CONTAINER

(71) Applicant: SIDEL PARTICIPATIONS, Octeville sur Mer (FR)

(72) Inventor: Mikael Derrien, Octeville sur Mer (FR)

(73) Assignee: SIDEL PARTICIPATIONS, Octeville-sur-Mer (FR)

(*) Notice: Subject to any disclaimer, the term of this patent is extended or adjusted under 35 U.S.C. 154(b) by 0 days.

(21) Appl. No.: 16/451,658

(22) Filed: Jun. 25, 2019

(65) Prior Publication Data

US 2019/0315042 A1     Oct. 17, 2019

Related U.S. Application Data

(62) Division of application No. 14/778,133, filed as application No. PCT/FR2014/050658 on Mar. 21, 2014, now Pat. No. 10,442,128.

(30) Foreign Application Priority Data

Mar. 27, 2013 (FR) ..................................... 13 52781

(51) Int. Cl.
*B29C 49/48* (2006.01)
*B29C 49/12* (2006.01)
(Continued)

(52) U.S. Cl.
CPC .............. *B29C 49/48* (2013.01); *B29C 49/12* (2013.01); *B29C 65/08* (2013.01); *B29C 65/14* (2013.01);
(Continued)

(58) Field of Classification Search
CPC ......... B29C 49/48; B29C 65/16; B29C 65/08; B29C 65/14; B29C 49/12;
(Continued)

(56) References Cited

U.S. PATENT DOCUMENTS 4,228,122 A * 10/1980 Hammes ............... B29C 49/482
264/534
4,378,328 A 3/1983 Przytulla
(Continued)

FOREIGN PATENT DOCUMENTS

FR    2 730 471    8/1996
FR    2 753 435    3/1998
(Continued)

OTHER PUBLICATIONS

International Search Report dated May 5, 2014, corresponding to PCT/FR2014/050658.

*Primary Examiner* — Ernesto A Grano

(57) ABSTRACT

Container having a body and a bottom that together delimit an internal primary volume of the container, this container also comprising a protruding base comprising an outer wall and an inner wall, the base comprising a skirt which protrudes from the region of the join between the body and the bottom, and a foot which lies at a lower end of the skirt and defines a setting-down plane for the container, in which container: —the walls are locally welded together in the region of the skirt; —the foot forms a hollow bulge, and the outer wall, the inner wall and the setting-down plane together define a secondary volume isolated from the primary volume by the weld.

3 Claims, 4 Drawing Sheets

(51) Int. Cl.
    *B29C 65/08*     (2006.01)
    *B29C 65/14*     (2006.01)
    *B29C 65/16*     (2006.01)
    *B65D 1/02*     (2006.01)
    *B29K 667/00*     (2006.01)
    *B29L 31/00*     (2006.01)

(52) U.S. Cl.
    CPC .............. *B29C 65/16* (2013.01); *B65D 1/023* (2013.01); *B65D 1/0276* (2013.01); *B29C 2049/4892* (2013.01); *B29K 2667/003* (2013.01); *B29L 2031/7158* (2013.01)

(58) Field of Classification Search
    CPC .......... B29C 2049/4892; B65D 1/0276; B65D 1/023; B29L 2031/7158; B29K 2667/003
    USPC ......................................................... 215/40
    See application file for complete search history.

(56) References Cited

U.S. PATENT DOCUMENTS

| | | | |
|---|---|---|---|
| 4,529,570 A * | 7/1985 | Przytulla | B29C 49/4802 264/534 |
| 4,552,275 A | 11/1985 | Chang | |
| 4,643,323 A | 2/1987 | Schutz | |
| 4,713,207 A | 12/1987 | Udell | |
| 5,018,642 A | 5/1991 | Przytulla | |
| 5,051,084 A | 9/1991 | Guarriello | |
| 5,122,325 A | 6/1992 | Bartley | |
| 5,543,107 A | 8/1996 | Malik | |
| 6,126,033 A * | 10/2000 | Suttoni | B65D 1/16 220/604 |
| 6,153,145 A | 11/2000 | Desoutter et al. | |
| 6,182,853 B1 | 2/2001 | Julien | |
| 6,383,440 B1 | 5/2002 | Chen | |
| 6,419,109 B1 | 7/2002 | Julien | |
| 9,254,604 B2 | 2/2016 | Lisch | |
| 9,630,358 B1 | 4/2017 | Liu | |
| 2008/0283533 A1 | 11/2008 | Tilton et al. | |
| 2013/0043255 A1 | 2/2013 | Boukobza | |
| 2015/0360410 A1 | 12/2015 | Standaert | |
| 2016/0001491 A1 | 1/2016 | Desoutter | |

FOREIGN PATENT DOCUMENTS

| | | |
|---|---|---|
| FR | 2 959 214 | 10/2011 |
| JP | H08 192458 | 7/1996 |
| JP | H11 42697 | 2/1999 |
| JP | 2008 254244 | 10/2008 |
| WO | 88/05747 | 8/1988 |

\* cited by examiner

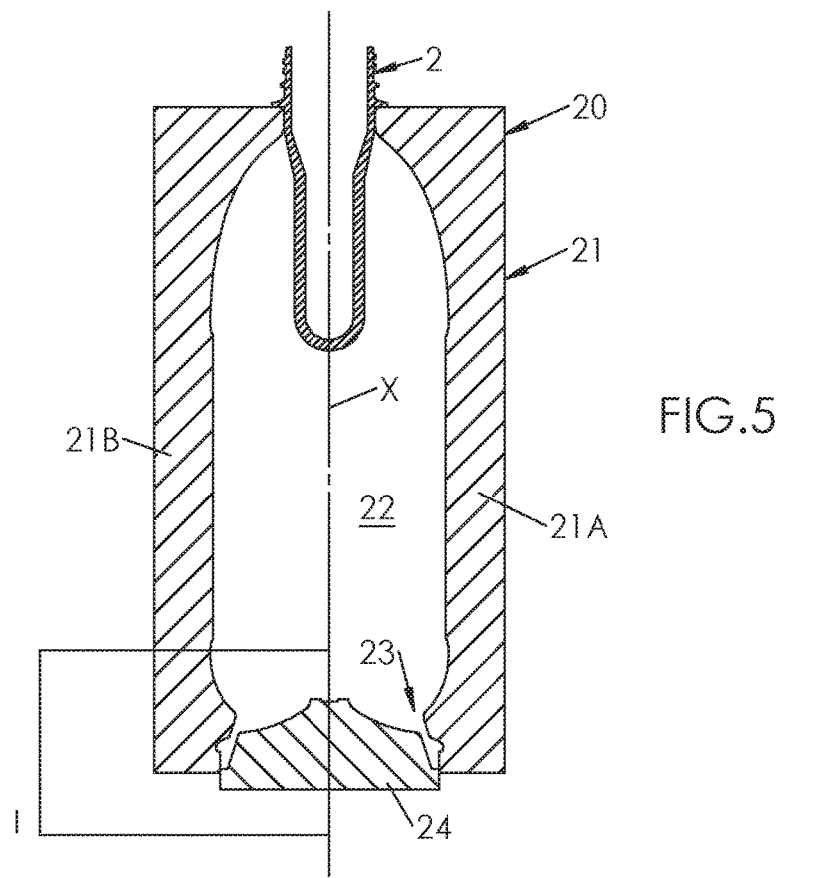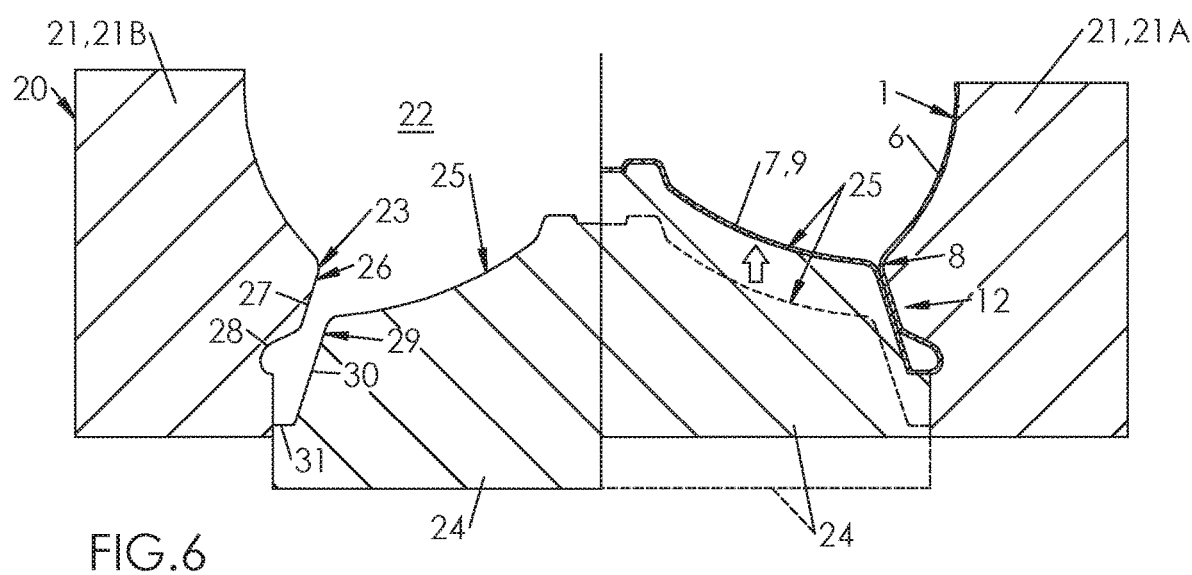

CONTAINER WITH A REINFORCED BASE AND METHOD FOR MANUFACTURING SUCH A CONTAINER

The invention relates to the field of containers, particularly bottles or jars, manufactured by blow molding or stretch-blow molding from parisons of plastic material such as polyethylene terephthalate (PET).

BACKGROUND OF THE INVENTION

The manufacturing of a container by blow molding consists ordinarily of inserting into a mold, constituting the impression of the container, a parison (it can be a preform or an intermediate container obtained by pre-blow-molding of a preform), previously heated to a temperature greater than the glass transition temperature of the material, and consists in injecting into the parison a fluid (particularly a gas such as air) under pressure. The blow molding can be completed by a preliminary stretching of the parison by means of a sliding rod.

The molecular dual orientation that the material undergoes during the blow molding (axial and radial, respectively parallel and perpendicular to the general axis of the container) imparts a certain structural rigidity to the container.

However, the requirements of the market economy, or the anti-pollution standards, lead manufacturers to use ever smaller amounts of material. Other things being equal, the effect of this is a reduction in the mechanical performance of the containers, due in particular to a reduced rigidity of the bottom that has a tendency to collapse under the hydrostatic pressure of the contents.

For this reason, a great deal of work has been done by the manufacturers on the shape of the bottoms to increase their rigidity.

Thus, it is known to make the bottom rigid by means of ribs; see, for example, French patent FR 2 753 435 (Sidel). This bottom keeps its mechanical strength without being inverted as long as the conditions of volume and/or pressure in the container are normal. However, when the conditions are extreme, the bottom nevertheless has a tendency to collapse.

In addition, arched bottoms, referred to as "champagne" bottoms, are known; see, for example, French patent FR 2 730 471 or its U.S. equivalent U.S. Pat. No. 6,153,145. This type of bottom, inspired by the bottoms of glass champagne bottles, exhibits the advantage of offering good strength as well as good stability, but it nevertheless has the drawback of using a large amount of material.

In practice, the most mechanically stable bottoms of containers are those whose shape comes closest to that of a sphere because of a distribution of relatively uniform stresses. However, a container with a spherical bottom cannot be stable if it is not for that matter provided with a base. This is why the majority of the containers with spherical bottoms (intended particularly for carbonated beverages), generally have added bases (particularly by snapping-on or by gluing, see, typically, U.S. Pat. No. 4,552,275 Owens Ill.) or formed by projecting from the bottom, see U.S. Pat. No. 5,122,325 Broadway Companies.

The added bases require additional operations for manufacturing and for reprocessing waste materials, which make this type of container undesirable in today's market. As for the bases formed by projection, they appear promising but produce manufacturing difficulties, to the point that, in U.S. Pat. No. 5,122,325 cited above, the base is already shaped on the preform from which the container is formed. This technique is not without drawbacks. First, it requires an addition of material. Then, the final formation of the base during the blow molding of the container is difficult to control.

Also, particularly for carbonated beverage applications, numerous petaloid-shaped bottoms are known, comprising an alternation of valleys, of hemispheric curvature, and of projecting feet, whose ends form a seat for the container; see, for example, French patent application FR 2 959 214 or its U.S. equivalent US 2013/043255. The petaloid-shaped bottom appears as a relatively successful solution combining good resistance to strong internal pressures in the container (because of the hemispheric curvature of the valleys) and a relative lightness. However, the petaloid-shaped bottom has the drawback of being rather unstable during operations of handling the container on the packaging lines.

SUMMARY OF THE INVENTION

An objective of the invention is to propose a manufacturing method for a container with an integrated base (as well as such a container) that meets, separately or together, the following requirements:
  to offer good mechanical performance, in particular good stability of the bottom,
  to offer good blowability,
  to use little material.

For this purpose, according to a first aspect, a manufacturing method is proposed for a container having a neck, a body and a bottom that jointly delimit an inner primary volume of the container, this container further comprising a base, which is formed projecting from a joining area between the body and the bottom by a fold of material, and comprising an outer wall, formed in the extension of the body, and an inner wall formed in the extension of the bottom, the base comprising a skirt, which extends projecting from the joining area between the body and the bottom, and a foot, which extends at a lower end of the skirt, and defines a standing plane for the container, this method being performed in a mold comprising, on the one hand, a peripheral wall, delimiting a cavity whose inner surface constitutes the impression of the body of the container and that of the outer wall of the base and, on the other hand, a mold bottom that has a raised surface whose shape constitutes the impression of the bottom of the container and of the inner wall of the base and that works with an open end of the cavity, the mold bottom and the peripheral wall being mounted to move in relation to one another between an initial position, in which the raised surface is separated from the cavity, and a final position, in which the raised surface blocks the opening of said end to complete the impression of the container, this method comprising the operations consisting in:
  inserting a previously heated parison into the mold while the mold bottom and the peripheral wall are in the initial position,
  injecting a pressurized fluid into the parison,
  placing the mold bottom and the peripheral wall in the final position, to bring about said fold of constituent material of the skirt,
  extracting the thus formed container from the mold,
  locally welding (particularly ultrasonically—as a variant, the welding can be performed by other techniques such as laser or radiofrequency) the outer wall and the inner wall of the base in the area of the skirt, within a welding device that is separate from the mold.

Such a welding makes it possible to make the base rigid, for the benefit of the stability of the container obtained. The blowability of the container is not affected by this technique, which furthermore does not require additional material.

According to a second aspect, a container is proposed that is obtained by blow molding or stretch-blow molding from a parison of plastic material, this container having a neck, a body, and a bottom that jointly delimit an inner primary volume of the container, this container further comprising a base, which is formed projecting from a joining area between the body and the bottom by a fold of material, and comprising an outer wall, formed in the extension of the body, and an inner wall, formed in the extension of the bottom, the base comprising a skirt, which extends projecting from the joining area between the body and the bottom, and a foot, which extends at a lower end of the skirt and defines a standing plane for the container, a container in which:

the walls are locally welded to one another in the area of the skirt;
the foot forms a hollow bulge, the outer wall, the inner wall and the standing plane that jointly define a secondary volume that is isolated from the primary volume by the welding.

The skirt, for example, is in the shape of a truncated cone or is annular.

BRIEF DESCRIPTION OF THE DRAWINGS

Other objects and advantages of the invention will be brought out in the description of an embodiment, given below with reference to the accompanying drawings in which:

FIG. 5 is a cutaway view showing a a mold for the manufacture of the container of FIGS. 1 and 2, equipped with a wall and a mold bottom that is mounted to move relative to the wall between a low position (as illustrated in FIG. 5) and a high position;

FIG. 6 is a detail view of the mold of FIG. 6, showing, on the left, the low position of the mold bottom and, on the right, the high position of the mold bottom;

DETAILED DESCRIPTION OF THE PREFERRED EMBODIMENTS

Throughout this description, as well as, where appropriate, in the claims, the terms "lower," "upper," "top," "bottom," etc., are used with reference to the drawings for greater ease of understanding. They must not be understood as being limitations of the scope of the invention, particularly regarding the orientation of the containers or molds for their manufacture. Actually, the vertical orientation of the axis of the containers and the corresponding orientation of the manufacturing molds, with the mold bottoms located below the mold part or parts being used for the molding of the body of the containers, is only one preferred embodiment.

Figure 1:
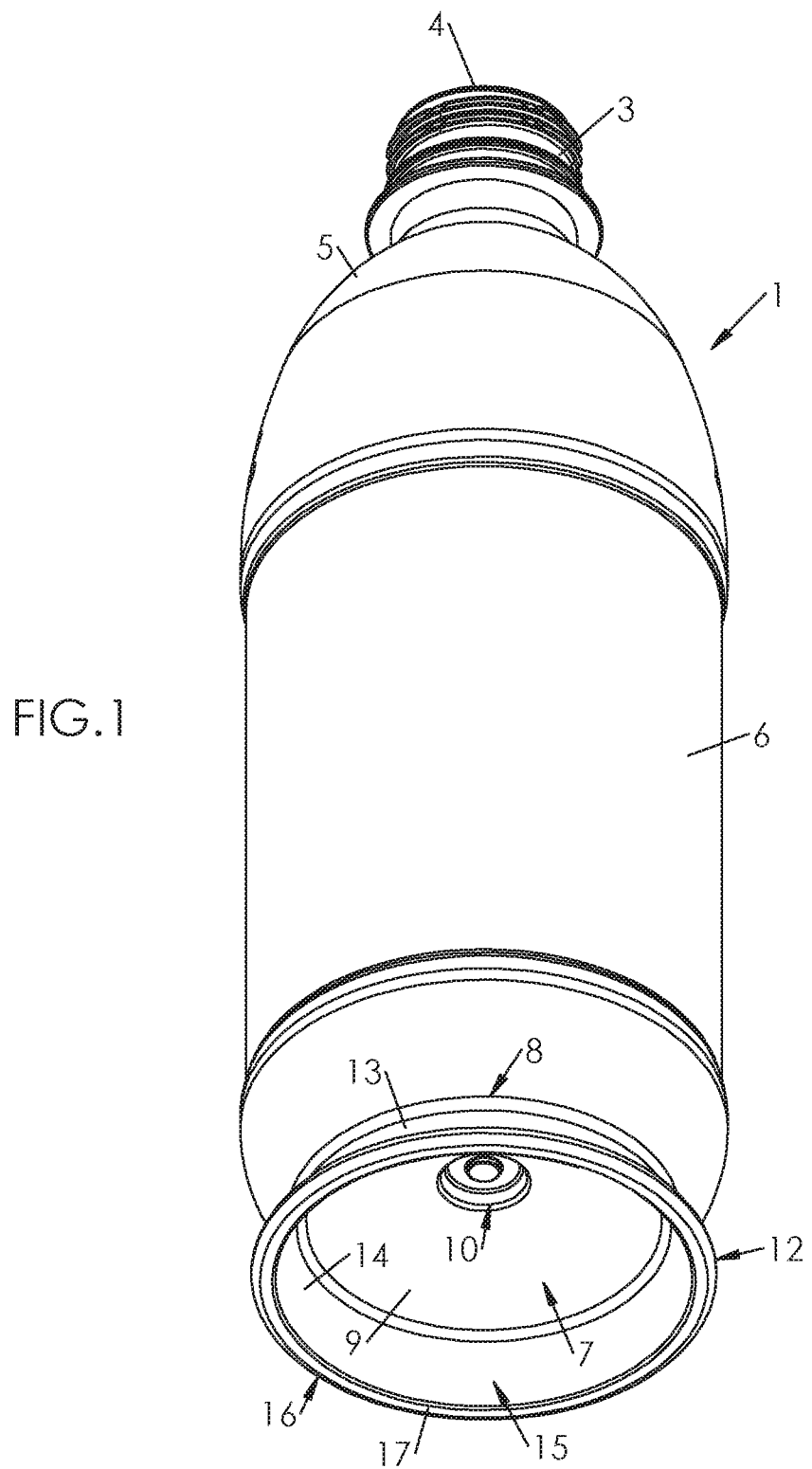
FIG. 1 is a bottom perspective view of a container with an integrated base.

Shown in FIG. 1 is a container 1, in this particular case a bottle, made by blow molding or stretch-blow molding from a parison 2 (in this case a preform) of thermoplastic material, in this case of PET (polyethylene terephthalate).

This container 1 comprises, at an upper end, a neck 3 that opens toward a rim 4. In the extension of the neck 3, the container 1 comprises in its upper part a shoulder 5 that flares out in the direction opposite to the neck 3, this shoulder 5 being extended by a lateral wall or body 6, with a generally rotationally-cylindrical shape around a main axis X of the container 1 (illustrated in FIG. 5).

The container 1 further comprises a bottom 7 that extends away from the neck 3, from a lower end of the body 6 that constitutes a joining area 8 between the body 6 and the bottom 7. As in the illustrated example, the joining area 8 between the body 6 and the bottom 7 can be narrowed relative to the rest of the body 6. According to a particular embodiment, the diameter measured in the area of the lower end of the body 6, at the site of the joining area 8 with the bottom 7, is, for example, about ⅘ of the overall diameter of the body 6.

In the example illustrated, the bottom 7 comprises an arch 9 that extends from the joining area 8 up to a central area 10 forming a projection toward the interior of the container 1 in the direction of the axis X. According to an embodiment illustrated in FIG. 2, the arch 9 is concave and faces toward the interior of the container 1. As a variant, however, the arch could be concave and face outward.

The body 6 and the bottom 7 together delimit an inner primary volume 11 of the container 1, into which the contents (typically a liquid, particularly a beverage, which can be carbonated) of the container 1 are intended to be introduced.

As is seen in the figures, the container 1 further comprises a base 12 that is formed projecting from the joining area 8, at the lower end of the body 6, by a fold of material that is produced by blow molding. It is by this base 12 that the container 1 can rest on a flat surface such as a table.

The base 12 exhibits a double thickness and comprises an outer wall 13, formed in the extension of the body 6, and an inner wall 14 formed in the extension of the bottom 7 and folded against the outer wall 13.

More specifically, the base 12 comprises, in the first place, a skirt 15, which extends projecting from the joining area 8, and a foot 16, which extends at a lower end of the skirt and defines an annular standing plane 17 for the container 1.

Figure 2:
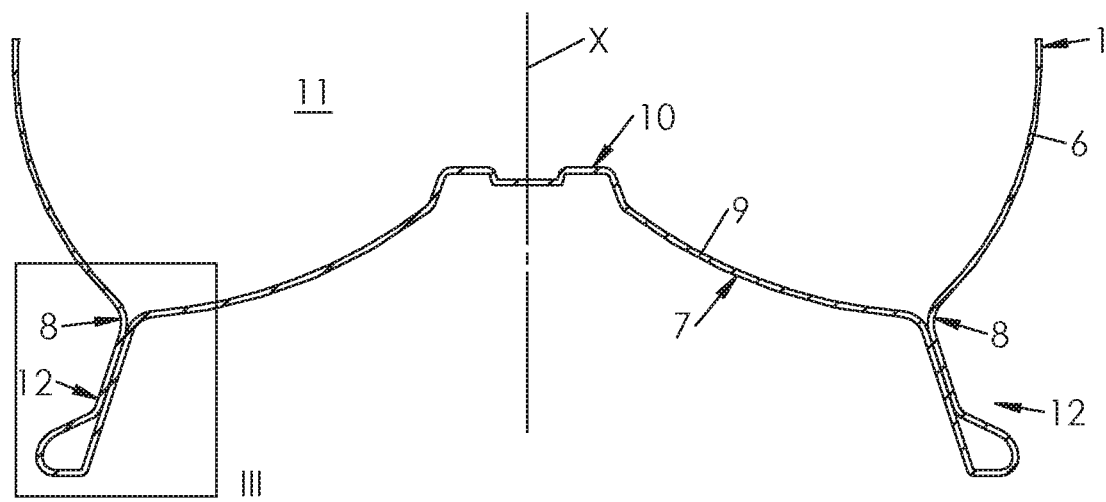
FIG. 2 is a partial radial cutaway view of the container of FIG. 1.
Figure 3:
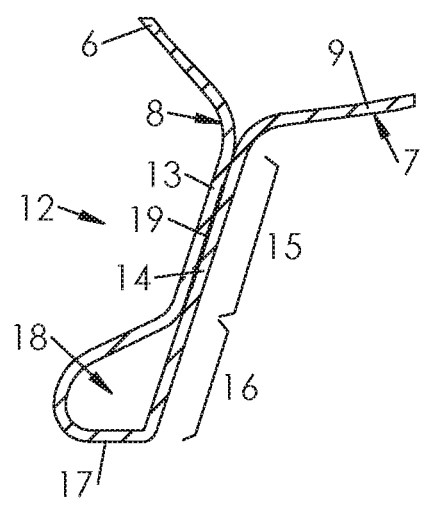
FIG. 3 is a detail view, on an enlarged scale, of the container of FIG. 2, taken from the insert III.

According to an embodiment illustrated in FIGS. 2 and 3, the skirt 15 has an approximately conical shape that is flared outward from the container 1 (in other words, downward). According to a variant embodiment illustrated in FIG. 4, the skirt 15 is annular and extends approximately in the manner of a collar around the axis X.

Figure 4:
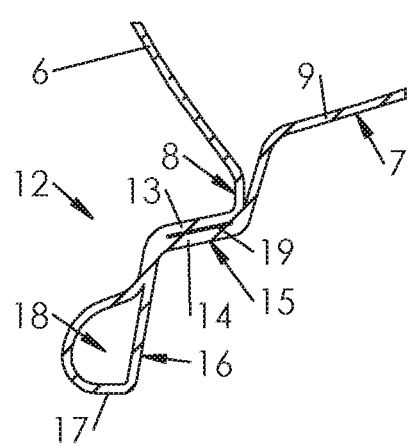
FIG. 4 is a view similar to FIG. 3, according to a variant embodiment.

As is seen clearly in FIGS. 3 and 4, the foot 16 forms a hollow bulge in radial projection opposite the axis X. In other words, the foot 16 forms approximately a circular ring around the axis X, with a radial cross-section approximately in the shape of a d (as shown in FIGS. 3 and 4). In this way, the outer wall 13, the inner wall 14, and the standing plane 17, while extending in a transverse plane that is perpendicular to the axis X ensuring the junction between them, jointly define a secondary volume 18.

In the area of the skirt 15, the outer wall 13 and the inner wall 14 are in mutual contact. More specifically, the outer wall 13 and the inner wall 14 are locally welded to one another in the area of the skirt 15 by a weld 19. This weld 19 can be a spot weld made, for example, halfway up the skirt 15, or a weld that extends over a more extensive surface between a surrounding area of the joining area 8 between the body 6 and the bottom 7 and a surrounding area of the junction between the skirt 15 and the foot 16.

The weld 19 can form a local bond between the material of the outer wall 13 and that of the inner wall 14, thus forming locally, in the area of the skirt 15, a single body, or else be an annular weld extending to the interface between the outer wall 13 and the inner wall 14.

In the foot 16, however, the outer wall 13 and the inner wall 14 are separated from one another to form the secondary volume 18 in which a toroidal air bubble is trapped. This air bubble, trapped in the foot 16 during blow molding, is at a pressure that is higher than or equal to the atmospheric pressure. However, since the weld is, as we will see, produced by an additional operation after the blow molding, a relative equalization of the pressures between the primary volume 11 and the secondary volume 18 can occur during the degassing of the container 1 following the blow molding, by a release at the interface between the outer wall 13 and the inner wall 14 before their welding.

The welding 19 contributes to making the skirt 15 (and therefore the base 12) rigid by preventing the sliding of the walls 13, 14 over one another. A better mechanical strength of the bottom 7 and a slighter risk of inverting it in particular results from it.

By its shape, the foot 16 offers a relatively wide standing plane 17, favorable for good stability of the container 1. Further, the bulge of the foot 16, by its rounded shape, facilitates the conveying of the container 1 over any type of conveyor (belt, roller) and limits the risks of wedging of the base 12 in the gaps between adjacent conveyor elements.

In FIGS. 5 and 6, a mold 20 for the manufacture by blow molding or stretch-blow molding of the container 1 from a parison 2 (in this case a preform) has been shown.

This mold 20 comprises a peripheral wall 21, defining a cavity 22, that constitutes the impression of the body 6 of the container 1 and that is pierced with an opening 23 at one end, and opposite the opening, a mold bottom 24 having a raised surface 25 whose shape constitutes the impression of the bottom 7 of the container 1. The mold bottom 24 and the peripheral wall 21 are mounted to move in relation to one another between an initial position, in which the raised surface 25 is separated from the cavity 22, and a final position, in which the raised surface 25 blocks the opening 23 to complete the impression of the container 1.

In the preferred embodiment, illustrated in FIG. 5, in a way known in the art, the peripheral wall 21 is made up of at least two mating parts 21A, 21B (known by the name of half-molds or half-shells), which each define a portion of the cavity 22. The two parts can be separated from one another during the insertion of a preform and during the withdrawal of a container, even though they are flattened against one another to form the cavity 22 during the manufacture.

The mold 20 is oriented along a vertical axis, corresponding to that of the container 1, and the container 1 is formed neck up. To do this, the cavity 22 is oriented with its opening 23 downward, and the mold bottom 24 is found in the area of the opening 23 of the cavity 22, with the raised surface 25 oriented upward, therefore toward the interior of the cavity. Further, to impart the relative mobility of the mold bottom 24 and the peripheral wall 21, it is the mold bottom 24 that is mounted to move in relation to the peripheral wall 21 between a low position (illustrated in FIG. 5 and on the left in FIG. 6), in which the raised surface 25 is separated from the cavity 22, and a high position, in which the raised surface 25 blocks the opening 23 to complete the impression of the container 1.

As can be seen in FIG. 6, the peripheral wall 21 defines, beyond the opening 23, an inner peripheral surface 26 constituting the impression of the outer wall 13 of the base 12, including a truncated cone-shaped upper cross-section 27 constituting the outer impression of the skirt 15 and a toroidal lower cross-section 28 constituting the impression of the bulge of the foot 16. In a complementary manner, the mold bottom 24 exhibits, in the extension of its raised surface 25, an outer peripheral surface 29 constituting the impression of the inner wall 14 of the base 12, including a truncated cone-shaped upper cross-section 30 constituting the outer impression of the skirt, and an annular lower cross-section 31 constituting the impression of the standing plane 17.

The container 1 is formed in the following manner. The parison 2 is first inserted into the mold 20 after having been previously heated to a temperature greater than the glass transition temperature of the material (or about 80° C. for PET). The parts 21A and 21B are then separated, and the mold bottom 24 is in low position. Then, the parts 21A and 21B are brought together to form the cavity 22.

A pressurized fluid (particularly air) is then introduced into the parison 2 to form the container 1 by blow molding. The material undergoes an expansion (optionally accompanied by a stretching, by means of a stretching rod, not shown) in the cavity 22 until coming in contact with the peripheral wall 21 and with the raised surface 25 of the mold bottom 24, the mold bottom being kept in low position.

Under the pressure of the blow molding, the material then flows into the volume made between the inner peripheral surface 26 and the outer peripheral surface 29. At a predetermined time, the mold bottom 24 is moved to its high position, which brings the material of the bottom 7 to its final shape and position and forms the base 12 by pinching the material in the area of the skirt 15, although no welding of the material in the skirt 15 results, the PET not making it possible to perform a welding by simple contact at the temperatures used for the blow molding, in contrast to PVC, for example.

Once the container 1 is formed, it is extracted from the mold 20, and an additional welding operation is performed in the area of the skirt 15. This welding is performed by means of a welding device 32 that is separate from the mold 20.

Figure 7:
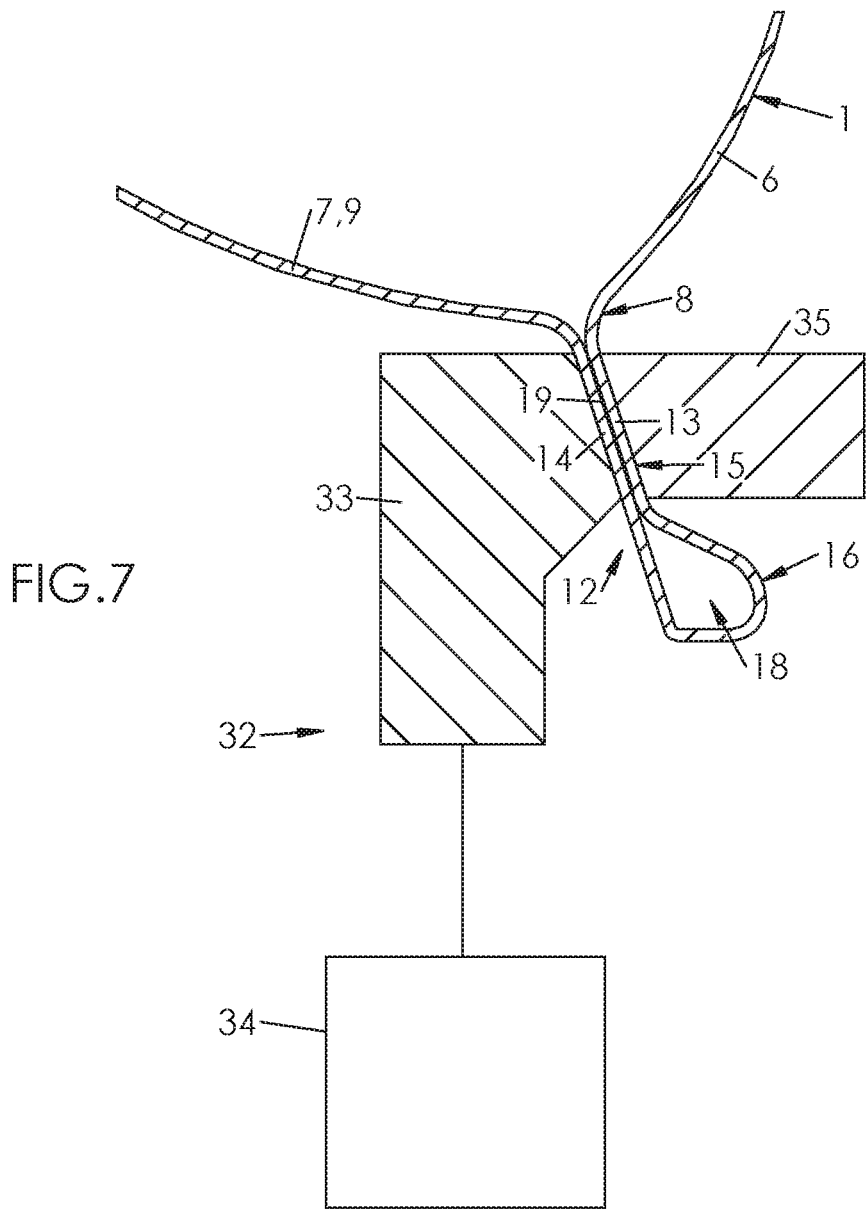
FIG. 7 is a detail cutaway view illustrating a welding operation performed on the base.

According to a particular embodiment, illustrated in FIG. 7, the welding is performed ultrasonically. The device 32 is then an ultrasonic welding device, which comprises a sonotrode 33 connected to a converter 34 of electrical energy into mechanical energy, applied against the inner wall 14 in the area of the skirt 15, and a contact anvil 35 applied on the other side against the outer wall 13, also in the area of the skirt 15. The ultrasonic vibrations of the sonotrode sufficiently heat the material at the interface between the outer wall 13 and the inner wall 14 to form their local bond.

As a variant, the welding can be performed by means of a laser beam (laser welding), or else by means of a radiofrequency field (also called high-frequency welding), the latter being particularly suited to polymers such as PET.

Further, although the welding operation described above is applied to a base 12 comprising a hollow foot 16 defining a secondary volume 18, this welding can be applied to a base whose foot would be solid, i.e., this foot would be formed by a lower end of the walls 13 and 14 that would be in contact with one another up to the standing plane 17.

The invention claimed is:

1. A container (1) obtained by blow molding or stretch-blow molding from a parison (2) of plastic material, said container (1) comprising:
   a neck (3), a bottom (7), and a body (6) between the neck (3) and the bottom (7) and connecting the neck (3) with the bottom (7), the neck (3) the body (6) and the bottom (7) jointly delimiting an inner primary volume (11) of the container (1); and
   a base (12) projecting from a joining area (8) where the body (6) joins with the bottom (7), the base (12) formed of a fold of material that includes an outer wall (13) formed from an extension of the body (6), and an inner wall (14) formed from an extension of the bottom (7), the base comprising a skirt (15) where the outer wall (13) and the inner wall (14) extend from the joining area and are in mutual contact with each other, and a foot (16) that extends from an end portion of the skirt (15) and contains a hollow bulge in which an air bubble is trapped, the foot (16) defining a standing plane (17) for the container (1),
   wherein the inner and outer walls (13, 14) are welded to one another at a portion of the skirt (15) between the joining area (8) and a junction of the skirt (15) with the foot (16), and
   wherein the bottom (7) of the container, from the joining area (8) to a central area (10) surrounded by the joining area (8), forms an arch that is concave facing an interior of the container.

2. The container according to claim 1, wherein the skirt (15) has a shape of a truncated cone.

3. The container according to claim 1, wherein the skirt (15) is annular.

* * * * *